(12) United States Patent
Beigel et al.

(10) Patent No.: US 6,888,502 B2
(45) Date of Patent: May 3, 2005

(54) MICROSTRIP ANTENNA FOR AN IDENTIFICATION APPLIANCE

(75) Inventors: Michael L. Beigel, Encinitas, CA (US); John R. Tuttle, Boulder, CO (US); H. Clark Bell, Chatsworth, CA (US)

(73) Assignee: Precision Dynamics Corporation, San Fernando, CA (US)

( * ) Notice: Subject to any disclaimer, the term of this patent is extended or adjusted under 35 U.S.C. 154(b) by 284 days.

(21) Appl. No.: 10/093,202

(22) Filed: Mar. 5, 2002

(65) Prior Publication Data

US 2003/0169207 A1 Sep. 11, 2003

(51) Int. Cl.$^7$ ................................................ H01Q 1/38
(52) U.S. Cl. ............................. 343/700 MS; 343/718; 340/572.7
(58) Field of Search ...................... 343/718, 700 MS, 343/702; 340/10.1, 572.1, 572.7

(56) References Cited

U.S. PATENT DOCUMENTS

| | | | |
|---|---|---|---|
| 5,886,669 A | * | 3/1999 | Kita ............................ 343/718 |
| 5,982,328 A | * | 11/1999 | Drevon ................. 343/700 MS |
| 5,995,048 A | | 11/1999 | Smithgall et al. ............ 343/700 |
| 6,111,549 A | | 8/2000 | Feller .......................... 343/795 |
| 6,127,977 A | | 10/2000 | Cohen ......................... 343/700 |
| 6,215,402 B1 | | 4/2001 | Rao Kodukula et al. 340/572.8 |
| 6,501,435 B1 | * | 12/2002 | King et al. .......... 343/700 MS |

* cited by examiner

Primary Examiner—Michael C. Wimer
(74) Attorney, Agent, or Firm—Kelly Bauerfeld Lowry & Kelly, LLP

(57) ABSTRACT

An identification appliance, such as a wristband, bracelet, patch, headband, necklace, card, sticker, or other wearable appliance, has an improved patch or microstrip antenna. The microstrip antenna comprises a conductive patch layer, a conductive ground layer and a dielectric layer in between the conductive layers. The microstrip antenna is mounted to or disposed in the identification appliance, where preferably the ground layer is closest to the user and the patch layer is furthest from the user. Electronic circuits may be located in the dielectric layer, on a surface of a conductive layer, or on another part of the identification appliance. Connecting holes through the dielectric layer may allow circuits to be connected to a conductive layer or layers. This improved antenna resolves detuning and communication degradation problems.

105 Claims, 3 Drawing Sheets

MICROSTRIP ANTENNA FOR AN IDENTIFICATION APPLIANCE

FIELD OF THE INVENTION

The field of the invention relates generally to antennas for identification appliances such as wristbands, and in particular to a microstrip antenna or patch antenna for identification appliances such as wristbands.

BACKGROUND OF THE INVENTION

This disclosure contemplates an improved identification wristband, bracelet, patch, headband, necklace, card, sticker, or other wearable appliance, which for the sake of convenience, are collectively referred to as a "band" or as an "identification appliance". Identification bands have become a convenient and effective way of identifying people without permanently marking them. A principle advantage of a band is that it is ultimately removable. Identification bands typically consist of a flexible wrist strap having a length greater than its width, and a closure or securement device for attaching and maintaining the band securely around the wearer's wrist. A portion of the band may be used for imprinting or otherwise attaching identification or other information regarding the wearer. Bar codes, radio frequency identification (RFID) devices and the like may also be used to store and transfer information associated with the band and the associated person or object. For example, RFID devices includes those which operate in the frequency in the range 30 kilohertz (kHz) to 300 Gigahertz (GHz). Various band constructions, attachments and other features including the storage of electronic data and RFID functions are described, for example, in Penuela U.S. Pat. No. 5,493,805, Mosher U.S. Pat. No. 5,457,906, Mosher U.S. Pat. No. 5,973,600, Beigel U.S. Pat. No. 5,973,598, Beigel U.S. Pat. No. 6,181,287, Peterson U.S. Pat. No. 5,479,797, and Peterson U.S. Pat. No. 5,581,924.

Bands are advantageous over other forms of ID cards containing data (such as credit cards, tickets or the like) since they can be attached to the wearer physically securely. As a result, current uses of identification bands include patient identification in hospitals, clinics and other locations; access in amusement parks; temporary security measures, facility access control, and ticketing and entitlement functions.

One important use for identification bands is patient identification and location in hospitals, clinics and other locations. When used in conjunction with an appropriate reader, patient information can be collected electronically and used by the medical staff in performance of their duties. Another example is to track the location of personnel such as convicts in a prison.

Identification bands provide information simply, for example, by a person visually reading printed information, or scanning barcode information, on the band or by electronically reading identification information transmitted by the identification band. Thus, barcodes, RFID devices and the like are used to enhance the information storage and data transfer of information associated with the band and the associated person or object. However, when an identification band transmits information to another device or receives information from another device, the accuracy of the information may be compromised by poor transmission.

Information is stored electronically in a transponder or RFID "tag" and that information is communicated to a tag "reader." Communication between the RFID tag and reader is by the transmission and reception of electromagnetic (EM) waves, and each must have an antenna to convert electrical signals to EM waves and vice versa.

Low power RFID systems can operate over a wide range of frequencies, including the high-frequency (HF) through super-high-frequency (SHF) radio bands, roughly 3 Megahertz (MHz) to 6 Gigahertz (GHz). The performance of an RFID tag operating in the high frequency (HF) band, for example at 13.5 MHz, is generally not affected by the tag's proximity to the human body. This is desirable for RFID tags used in identification bands. Coupling between the tag antenna and the reader antenna is primarily by the magnetic component of the reactive near field, in which the tag antenna is configured as a coil in a resonant circuit. However, a typical wristband is six inches in length, which must include an antenna, while the wavelength at 13.5 MHz is 73 feet, and it is well known that antennas which are a small fraction of a wavelength in linear dimensions are very inefficient radiators and receptors. As a result, the useful range of operation may be very limited and sometimes can be just a few inches from the reader antenna. This is a significant disadvantage which may limit the usefulness of HF tags in identification bands and may render them unusable, for example, in personnel location or ingress/egress alarm applications.

RFID systems may also operate at much higher frequencies, including operation at or in the vicinity of 400 MHz, 915 MHz, 2.45 GHz in the ultra-high frequency (UHF) band and 5.88 GHz in the SHF band. At these frequencies, coupling between the tag and reader antennas is by the radiating far field, which is the electromagnetic (EM) wave that propagates over distances of more than a few wavelengths. These frequencies correspond to wavelengths from 30 inches down to 2 inches, which are much more suitable, in terms of efficiency, for antennas in a band or other structure of comparable size. As a result of the more efficient antennas, operation at these frequencies may result in substantially higher ranges, typically up to ten feet or more. However, compared to the HF band, the radiation and reception of EM waves at these higher frequencies bands are affected much more strongly by obstacles and materials in the immediate environment of the antenna as a result of the shorter wavelengths. In particular, a loop or dipole antenna, operating on or adjacent to the human body, for example in a band, will be severely detuned and possibly rendered inoperable, with a commensurate degradation of the communication link. Thus the usability of these antennas in identification-bands with RFID capability is very limited.

The aforementioned antenna detuning and communication degradation problems are directly attributable to the fact that an isolated (free of nearby obstacles) loop or dipole antenna normally radiates EM energy in opposite directions. But, when on or near the surface of a human body, the reactive near fields (the electric and magnetic fields closest to the antenna) are distorted by the human tissue, causing an impedance mismatch between the antenna and the circuit to which it is immediately connected. This mismatch effectively detunes the antenna and reduces the amount of EM energy radiated in the direction away from the human body.

Therefore, there is a need for an improved antenna for an identification band.

SUMMARY OF THE INVENTION

A microstrip or patch antenna for an identification appliance, such as a wristband, bracelet, patch, headband, necklace, belt, card, sticker, or other wearable appliance, comprises a conductive patch layer, a conductive ground layer and a dielectric layer in between the conductive patch and ground layers. The microstrip antenna is mounted to or disposed in the identification appliance, where preferably the conductive ground layer is closest to the user and the conductive patch layer is furthest from the user.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

DETAILED DESCRIPTION OF THE PREFERRED EMBODIMENTS

As used in this specification, the meaning of "in," whether alone or in a compound such as "therein," includes "in" and "on"; "radio frequency identification" and "RFID" refer to identification by radio frequency communication.

Figure 1:
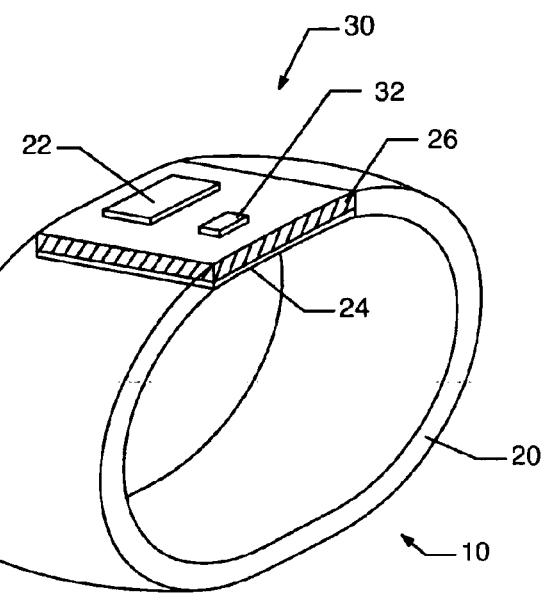
FIG. 1 is a high level block diagram representation of an example embodiment of an improved identification appliance with a microstrip antenna.

FIG. 1 is a representation of an example embodiment of an identification appliance 10 containing a microstrip antenna 30 as a part thereof. The microstrip antenna 30 is preferably a patch antenna. The identification appliance 10 has a structure 20 carrying a communication circuit 32, such as a RFID circuit. The communication circuit 32 may be adapted to communicate with any type of system, network, or device and may use any communication protocol, including Bluetooth or IEEE 802.11. In this embodiment as a band, the identification appliance 10 includes a structure 20 that is suitable to be worn by, attached to, or carried by a person. Preferably, the identification appliance 10 is a wristband and the structure 20 is an elongate, flexible wristband material. For example, the structure 20 may be an elongated flexible strip of polymeric, paper, or organic substrate. However, the identification appliance 10 need not be attached only to the wrist of a person as it can be attached to the wrist, ankle, neck, or other part of a person or animal, or to an object.

The identification appliance 10 also includes a microstrip antenna 30. The microstrip antenna 30 may be separately attached to the structure 20 or integrated into the electronic circuits in the identification appliance 10. The microstrip antenna 30 may also be constructed with a flexible printed circuit board so that it will bend. Examples of flexible printed circuit boards are disclosed in U.S. Pat. Nos. 5,809,361, 6,210,518 and 4,677,528. The microstrip antenna 30 comprises a top conducting layer 22, which may be referred to as a "patch" or conductive patch layer 22, a bottom conducting layer 24 which acts as a ground plane, and a dielectric material 26 in between. The conductive patch and ground layers may also be referred to as patch and ground conductors. Preferably, the microstrip antenna 30 comprises a metallic conductive patch layer 22, a dielectric layer 26 and a ground plane 24, assembled into an antenna. The conductive patch layer 22 and conductive ground layer 24 may be formed of any conducting material, and each conductive layer may be made of a different conducting material. The conducting material includes, for example, conductive metals, foils, inks, polymers, organic materials and carbon. The conductive material may be etched, printed, sputtered, deposited, or otherwise formed to create the conductive patch layer 22 and/or the conductive ground layer 24. Of course, with any of the embodiments, the relative size difference between the conductive patch layer 22 and the conductive ground layer 24 may be changed. For instance, the conductive ground layer 24 may be larger than the dielectric layer 26 and may extend further along the structure 20 than illustrated in FIG. 1. In fact, the conductive ground layer 24 may extend all the way around structure 20. Further, the thicknesses of the conductive patch layer 22, dielectric layer 26 and conductive ground layer 24 may be various thicknesses. The dielectric layer 26 may comprise any dielectric material, including foam, plastic, air, or a corrugated plastic. The components of the microstrip antenna 30 are preferably connected or embedded in the structure 20.

The microstrip antenna 30 can be manufactured in many ways, but is preferably fabricated from a printed circuit board material having copper cladding on both sides. More specifically, the microstrip antenna 30 is preferably formed on a printed circuit board comprising a planar dielectric layer. The dielectric layer 26 has a copper cladding on one entire side of the layer which forms a ground plane 24 and a copper cladding on the other side which is etched to form a conductive patch layer 22. Although it is preferable to have the copper cladding on the entirety of one side of the dielectric layer 26, it is possible to have the copper cladding cover a substantial portion, but not the entirety of the side. Of course, the size, dimension and shape of the components of the microstrip antenna 30 may be varied. For example, the conductive patch layer 22 may be circular, oval, or semi-circular.

The microstrip antenna 30 can be made relatively thin so that it may be easily attached to or imbedded in an identification appliance 10 so as to not be awkward for the wearer. The microstrip antenna 30 may be made small by using a thin dielectric layer 26 with a high dielectric constant. The thickness of the dielectric layer 26 is preferably on the order of one-hundredth of the free space wavelength of the radiated signal, and the patch itself is of length L and width W, where W is less than L.

When L is approximately a half wavelength in the dielectric layer 26, the microstrip antenna 30 forms a transmission line resonator with open circuits at opposite ends. The ends of the microstrip resonator 30 act as a pair of slot radiators because of the electric fields at the two open circuits. The far field radiation produced by this microstrip antenna 30 will be strongest in the direction normal to the conductive patch layer 22, with the electric field polarization in the plane of the conductive patch layer 22 and parallel to the length of the conductive patch layer 22, i.e. a linearly-polarized (LP), electromagnetic (EM) wave. Both near and far fields will be minimum in the direction normal to the ground plane 24. Maximum radiation from the microstrip antenna 30 is normal to, and on the same side as, the conductive patch layer 22, and minimal or no radiation occurs on the opposite side (ground plane 24). Undesirable proximity effects in an identification appliance are therefore mitigated by placing the ground plane 24 on the inner side toward the wearer. When used to implement RFID capability in an identification appliance, the microstrip antenna 30 has an inherently reduced near-field energy on one side, toward the body, therefore radiating efficiently away from the body. Thus, the microstrip antenna 30 may improve the operating range between an identification appliance reader, such as a wireless communication network, and an identification appliance 10 containing the microstrip antenna 30.

The microstrip antenna 30 may be driven in many ways. A first example is by a coaxial probe which protrudes through the ground plane 24 and connects to the conductive patch layer 22 at a point centered halfway across the width W. A second example is by a narrower microstrip transmission line which connects to the center of one end of the conductive patch layer 22. The efficiency of the microstrip antenna 30 (e.g., the ratio of radiated power to driving power) can be very high (e.g., 80 percent or more) when it is made of high quality materials with low dielectric losses and operates in the UHF and SHF bands. Thus, the microstrip antenna provides an improvement in performance size and cost when UHF and SHF frequencies are used. The common low-cost printed circuit board material, designated as FR-4, performs very poorly in these high frequency bands because of wide variations in dielectric constant and high dielectric loss, although it may still be usable. High quality materials for these frequencies are available from Rogers Corp., Chandler, Ariz. and include Rogers' material 4003.

When L and W are both approximately a half wavelength in the dielectric layer 26, the microstrip antenna 30 may resonate and radiate in two directions. If the power is divided equally between the two resonances and a 90-degree phase shift is introduced between them, the resulting far field radiation, which is normal to the conductive patch layer 22, will have an electric field which rotates in a circular pattern in the plane of the conductive patch layer, i.e. a circularly-polarized (CP) EM wave. If the rotation of the electric field is clockwise in the direction away from the microstrip antenna 30, it is a right-hand circularly-polarized (RHCP) wave, and if the rotation is counterclockwise, it is a left-hand circularly-polarized (LHCP) wave. The sense (RHCP or LHCP) is determined by which direction in the conductive patch layer 22 leads by 90 degrees. The advantage of using CP radiation from a wireless identification appliance 10 is that there is less dependence on antenna orientation when the reader antenna is either linearly polarized, or circularly polarized with the same sense as the antenna of the identification appliance 10.

As an alternative for any of the embodiments, the microstrip antenna 30 or a part of the microstrip antenna 30 may be fabricated as part of the closure mechanism (e.g., a securement means) for the structure 20, or within the closure mechanism of the structure 20. The closure mechanism may be coupled to the structure 20 by electrical or reactive coupling. Additionally, it is preferable for the components of the microstrip antenna 30 to be thin so that the resulting identification appliance 10 is thin and comfortable to wear.

It is preferred that the electronic communication circuitry 32, such as a RFID circuit, be contained on a bare surface mount die which is 0.010 to 0.020 inch thick. The mounting of the communication circuit 32, which may be in the form of an integrated circuit chip or a hybrid circuit chip, can be accomplished in several ways. It is necessary that the communication circuit 32 is electrically connected to both the conductive patch layer 22 and ground layer 24. When mounted on or adjacent to a conductive patch or ground layer, a direct connection (e.g., solder or conductive adhesive) is preferred between that conductive layer and the chip 32. Methods of connecting to a non-adjacent conductive layer include using a wire, cable, or a printed circuit transmission line. The circuitry 32 may also be implemented directly onto the dielectric layer 26, comprising printed circuits etched out of the copper cladding and discrete parts bonded to the circuits, which circuits are connected to the conductive patch layer 22 and conductive ground layer 24 by wires, cables, or printed circuit transmission lines.

The communication circuit 32 preferably comprises antenna circuitry, signal generator circuitry, programmable encoder circuitry and interconnection circuitry. In one embodiment, a surface mount RFID chip containing electronic circuits is mounted within the identification appliance 10 and electrically connected to the microstrip antenna 30. The circuitry comprising the communication circuit 32 can be, in various combinations, carried in the structure 20 or dielectric layer 26, or formed by deposition on a layer in the dielectric layer 26 of one or more of conductive paths, semiconductor devices, or polymer materials. A circuit consisting entirely of conductive, insulating and/or semiconductive materials directly deposited on the structure 20 or the dielectric layer 26 may also be used. In fact, any of the circuits on the identification appliance 10 can be made either partially or totally from semiconductors, conductors and insulators, and may be fabricated of inorganic or organic materials, as described in U.S. Pat. No. 5,973,598, the entire disclosure of which is incorporated herein by reference for all purposes. In other words, the identification appliance 10 may have electronic components made either partially or totally from semiconductors, conductors and insulators, which may be inorganic or organic, and which may be printed on the identification appliance 10. U.S. Pat. No. 5,973,598 describes organic components, any of which may be used in the improved identification appliance 10. As shown in FIG. 1, the communication circuit 32 resides on the conductive patch layer 22, but as explained later, the communication circuit 32 can be put in various other locations, as is true for any of the embodiments. The dielectric layer 26 and the printed components may be flexible.

The identification appliance 10 may have components for sensory, communication and display functions such as a vibrator, speaker, or visual display. The improved identification appliance 10 may contain a battery to provide primary or auxiliary power for electronic circuitry carried by it. The battery can be a flexible battery formed on the flexible structure 20. The battery may supply power to any device requiring power such as the communication circuit 32, which may further include a RFID circuit, electronic circuitry, optical circuitry, data storage device. The battery may be activated when the identification appliance 10 is fastened to its object, or activated by the reception of an optical signal or an electromagnetic signal. Optionally, the battery may include a solar component so that the battery is charged or recharged by ambient light; the solar cells and recharging circuitry can be formed out of inorganic or organic materials. The battery may be replaceable or not. The battery may be a flexible polymer battery imprinted on or constructed on the identification appliance substrate. U.S. Pat. No. 5,973,598 describes a polymer battery, which may be used in the improved identification appliance 30. An identification appliance 10 with a battery may be activated upon proper authorization or the start of service. If the battery runs out of power at or within a predetermined time period or calendar date/time, the software controlling the identification appliance 10 may stop the communication function or any other function. The load on the battery may be fixed, based on a programmable constant, or timed.

Any of the identification appliances or bands described in this disclosure may have electromagnetic energy absorption means so that the identification band may be energized by an external electromagnetic field signal. For example, an antenna may obtain power from a received signal, where the power is used to power some or all of the circuits on the identification appliance. The interrogating/powering electromagnetic signal provides power and enabling information to the identification band. The interrogating/powering signals may contain a power signal only or both a power signal and information modulated onto the power signal. Upon energizing by an electromagnetic signal, the identification band may display optically readable information according to the data programmed in the band, stored in the band, or received from the interrogating/enabling device.

Figure 2:
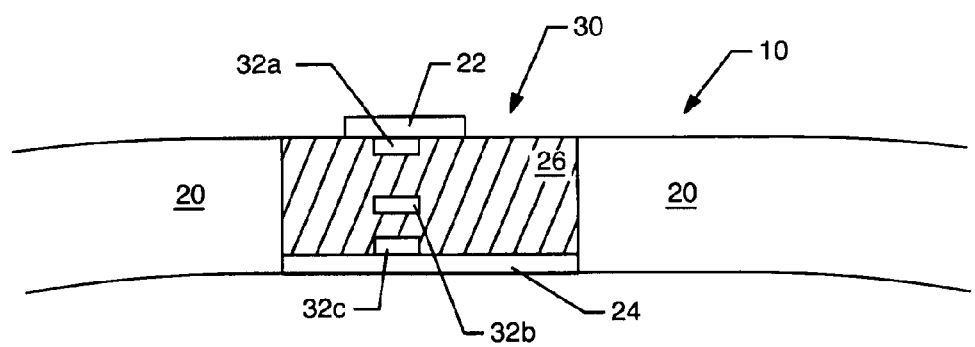
FIG. 2 is a representation of an example embodiment of an identification band containing communication circuit components, such as those for a RFID circuit, which are mounted in the dielectric material.

FIG. 2 is a representation of a longitudinal cross-section of an example embodiment of an identification appliance 10 containing communication circuit components 32a, 32b, 32c, such as those for a RFID circuit, which are mounted in the dielectric material 26. As with any of the embodiments, the communication circuit components 32a, 32b, 32c may further include a RFID circuit, electronic circuitry, optical circuitry, data storage device, and/or other circuits or devices. The identification appliance 10 includes a structure 20, which is preferably elongate so that the identification appliance 10 can be used as a wristband, and a microstrip antenna 30. The microstrip antenna 30 includes a conductive patch layer 22, a conductive ground layer 24 which acts as a ground plane, and a dielectric material 26 between the patch and ground layers 22, 24. In this embodiment, the communication circuit 32 is located in the region between the conductive patch layer 22 and the ground layer 24. This embodiment is less preferred than the other embodiments because it is possible for the circuit 32 and antenna to degrade each other's performance. Nonetheless, in this embodiment, the communication circuit components 32 are mounted in the dielectric material 26 and may be mounted on the bottom of the conductive patch layer 22 (e.g., see communication circuit component 32a), on top of the ground layer 24 (e.g., see communication circuit component 32c), or in between the patch and ground layers (e.g., see communication circuit component 32b). A wire or other conductor may be used to connect through a hole in the dielectric 26 to a conductive layer. The hole permits the passage of a conductive material to connect the circuit 32 to a conductive layer. An alternative to the hole is a conductive conduit, also known as a via or plated through-hole. Still alternatively, an inductive or capacitive coupler may be used instead of the wire conductor. All of the holes, conductive conduits and inductive/capacitative couplers may be referred to generally as "electrical couplers". By using bare die communication circuit components 32a, 32b, 32c, the circuit elements can be made as thin as 10 to 20 mils (thousandth of an inch) in height. In this embodiment, the communication circuit 32 is inside the resonating region of the microstrip antenna 30.

Figure 3:
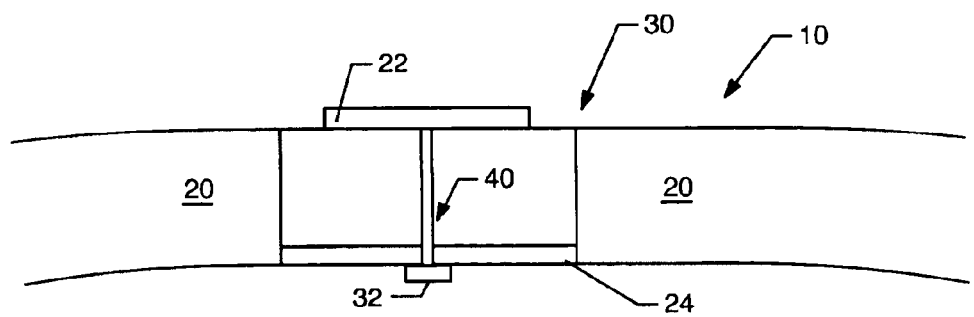
FIG. 3 is a schematic representation of another example embodiment of a microstrip antenna with a communication circuit, which may be, for example, a RFID chip.

FIG. 3 is a schematic representation of another example of a microstrip antenna 30 with a communication circuit 32, which may be, for example, a RFID chip. In this example embodiment, the communication circuit components 32 are mounted on, and directly connected to, the underside of the ground layer 24 (i.e., the side opposite the dielectric material 26). Again, as is true for any of the embodiments, by using bare die communication circuit components 32, the circuit elements can be made as thin as 10 to 20 mils in height. A wire or other conductor connects the communication circuit 32 to the conductive patch layer 22. The wire passes through a hole 40 in the dielectric 26. In this embodiment, the communication circuit 32 is outside the resonating region of the microstrip antenna 30.

Figure 4:
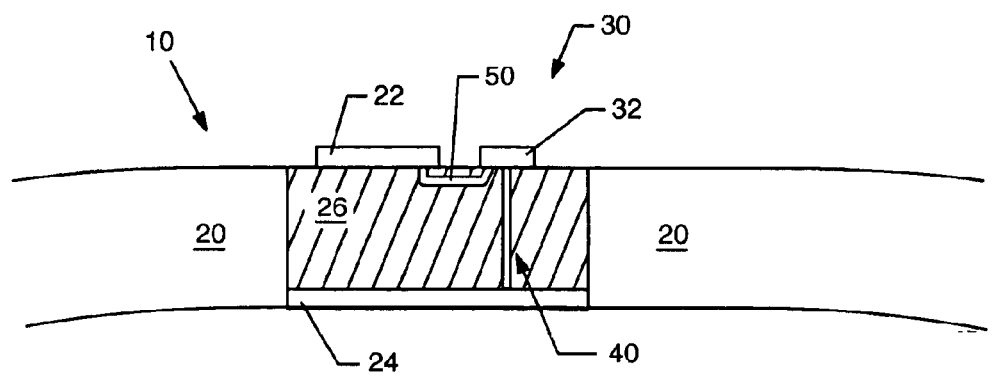
FIG. 4 is a schematic representation of yet another example embodiment of a microstrip antenna with a communication circuit, which may be, for example, a RFID chip.

FIG. 4 is a schematic representation of yet another example embodiment of a microstrip antenna 30 with a communication circuit 32, which may be, for example, a RFID chip. In FIG. 4, the communication circuit 32 is shown mounted on top of the dielectric 26, next to the conductive patch layer 22. A hole 40 through the dielectric material 26 allows the communication circuit 32 to contact the ground plane 24 under the dielectric material 26. The communication circuit 32 may be connected to the conductive patch layer 22 by a conductor on top of the dielectric material 26, or a conductor 50 buried in the dielectric material 26.

Figure 5:
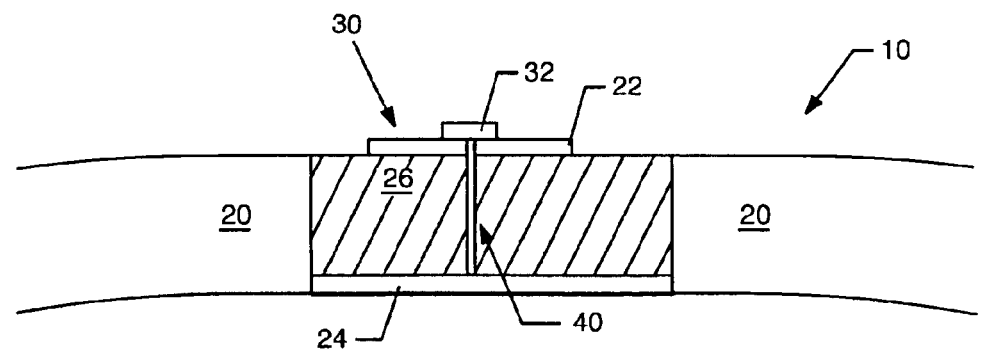
FIG. 5 is a schematic representation of another example embodiment of a microstrip antenna with a communication circuit, which may be, for example, a RFID chip.

FIG. 5 is a schematic representation of another example embodiment of a microstrip antenna 30 with a communication circuit 32, which may be, for example, a RFID chip. The communication circuit 32 is mounted on top of the conductive patch layer 22, which is on top of the dielectric material 26. A hole 40 extends through the conductive patch layer 22 and the dielectric material 26. The hole 40 gives the communication circuit 32 access to contact the ground plane 24 under the dielectric material 26, if desired.

Figure 6:
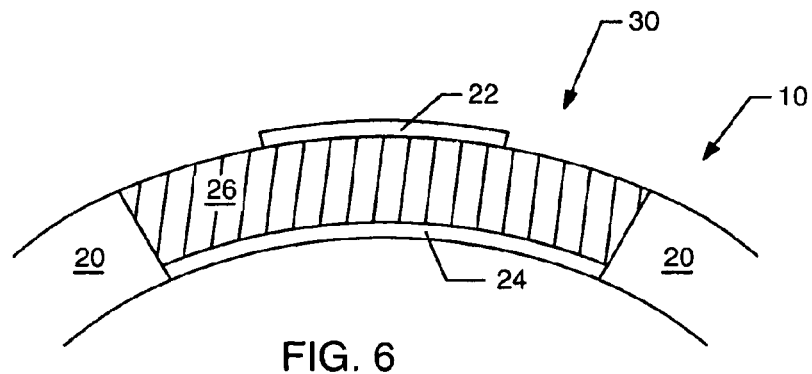
FIG. 6 is a schematic representation of still another example embodiment of a microstrip antenna with a communication circuit, which may be, for example, a RFID chip.

FIG. 6 is a schematic representation of still another example embodiment of a microstrip antenna 30 with a communication circuit, which may be, for example, a RFID chip. The microstrip antenna 30 in FIG. 6 is curved or contoured to create a better fit to the wearer of the identification appliance 10. A structure 20 such as a wristband may be attached to the microstrip antenna 30 and communication circuits (not illustrated in FIG. 6). The dielectric layer 26 may be flexible, or rigid and shaped with a curvature.

Figure 7:
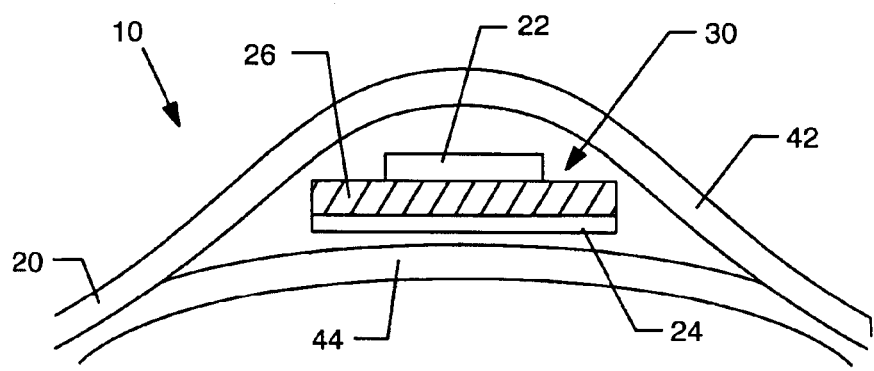
FIG. 7 is a representation of an example embodiment of a two-ply identification band.

An example method for attaching the microstrip antenna 30 and communication circuitry to the structure 20 is now described. FIG. 7 is a representation of an example embodiment of an identification appliance 10 whose structure 20 comprises a top non-conducting layer 42 and a bottom non-conducting layer 44. The microstrip antenna 30 and circuitry (not illustrated) are laminated in between the top and bottom non-conducting layers 42, 44. Additional non-conducting layers of material having low EM loss preferably are used to protect the microstrip antenna 30 and circuitry from moisture, abrasion, etc. For FIG. 7 as well as any of the embodiments, the circuitry may be in the form of a module. The microstrip antenna 30 and circuitry are made before they are laminated into the structure 20 or at the time of fabrication of the laminated product. For example, if the microstrip antenna 30 and circuitry are formed by a fast process such as printing, they may be fabricated at almost the same time the identification appliance 10 is being fabricated.

Figure 8:
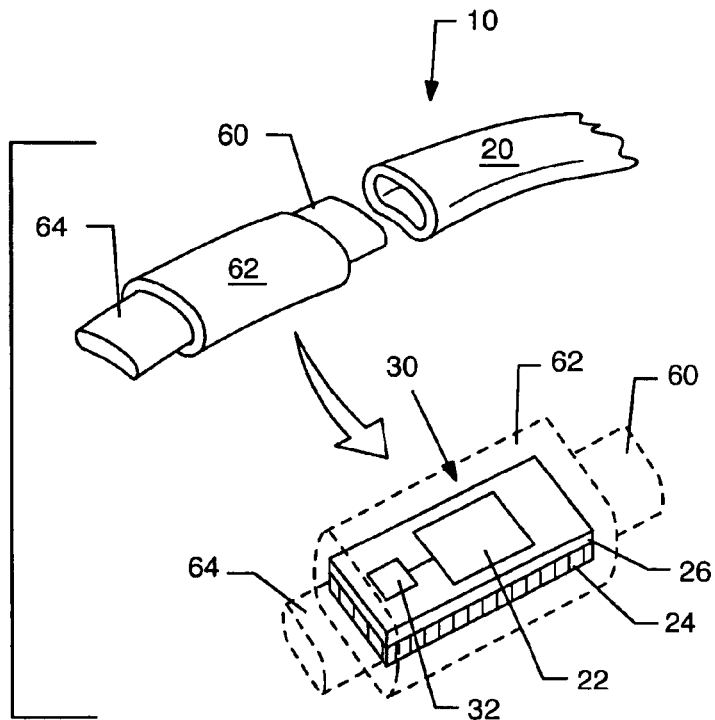
FIG. 8 is a representation of an example embodiment of a microstrip antenna built into the securement portion of an identification appliance.

FIG. 8 is a representation of an example embodiment of a microstrip antenna built into the securement portion of an identification appliance, which in this example, is an identification band. The identification appliance 10 has an elongate structure 20 which is tubular to accept a portion 60 of a closure or securement mechanism 62. An example of a tubular structure for an identification band is disclosed in U.S. Pat. No. 5,740,623. The other end 64 of the securement mechanism 62 is preferably adapted to fit into the other respective end of the tubular elongate structure 20. In this example embodiment, the microstrip antenna 30 has a conductive patch layer 22 coupled to a communication circuit 32 and residing on a dielectric material 26. The conductive ground layer 24 resides between the dielectric material 26 and the wearer's body (e.g., wrist, arm, ankle) of the identification appliance 10. Since the microstrip antenna 30 is in the securement mechanism 62, the antenna may be changed as desired without having to discard the entire identification appliance 10. Further, the ends 60, 62 of the securement mechanism 62 and the corresponding inner surface of the tubular structure 20 may have conductive contacts to form a circuit when the contacts are connected. This way, the identification appliance 10 can determine whether the securement mechanism 62 has been secured, removed, or tampered with.

In any of the embodiments, the identification appliance 10 may include optional structures and features, such as any of the features described below. For example, the communication circuit may perform a communication function of any type, and can communicate passively such as a transponder and/or actively by initiating communications. The identification appliance 10 may operate in the UHF or SHF radio bands.

Likewise, the communication circuit may include a control logic or processing unit, which may be a microprocessor, microcontroller, central processing unit (CPU), arithmetic logic unit (ALU), math coprocessor, floating point coprocessor, graphics coprocessor, hardware controller, programmable logic device programmed for use as a controller, or other control logic. The communication circuit further may include an optional data storage device, such as a memory of any kind. For example, the memory may be a random access memory (RAM), read only memory (ROM), programmable read only memory (PROM), electrically erasable PROM (EEPROM), ultraviolet light erasable PROM (UVPROM), fixed disk media, flexible disk media, flash memory, ferro-electric memory, organic semiconductor memory, tape, or any other storage retrieval means, or any combination of these volatile and non-volatile memory means. Of course, the movable media memories (e.g., disk, tape) may not be practical in an identification appliance made to fit a person's wrist unless if the movable media memory were small or thin. The data storage device may further permit reading only, reading and writing, or writing only.

The identification appliance 10 may carry optical-electronic components or circuits such as signaling, signal transmitting, signal receiving, or indicating circuits. The opto-electronic components may perform various functions such as signaling (e.g., by light from a light emitting diode), indicating (e.g., by emitting light or varying reflectances), displaying (e.g., of alphanumeric or image data by preformed indicators or matrix of indicators), sensing (e.g., of levels of light or sound), power conversion (e,g., photovoltaic cell). These components may be of silicon, polymers, or other materials. They may be inflexible and attached on the identification appliance 10. Alternatively, they may be flexible and attached to or printed on the identification appliance 10. The electronic, opto-electronic components may be printed or otherwise deposited on the structure 20.

The identification appliance 10 may be attached to an article where a circuit in the identification appliance 10 performs an optional electronic article surveillance (EAS) function, for example, to indicate the theft of the article. The EAS function does not transmit an identification code, but enables a reader to detect if the identification appliance 10 is near the reader.

The identification appliance 10 may be disposable (in one embodiment) or re-usable (in another embodiment) or have a disposable part and a re-usable part (in a third embodiment). It is possible to make the identification appliance 10 disposable and very inexpensive, such as a wristband. The disposable identification appliance 10 may incorporate any of the functions described in this disclosure, where the fastening means is not re-usable and the functionality of the identification appliance 10 is destroyed after its use. The identification appliance 10 may have a disposable section (for example, structure 20) and a re-usable section (for example, the communication circuit 32).

The identification appliance 10 also may be made water resistant, waterproof, and/or resistant to certain solvents or chemicals used in the area of its application.

The identification appliance 10 may be made tamper-proof or tamper-indicating. For example, conductive adhesive attachment of areas of the identification appliance 10 upon fastening to the wearer may activate printed conductive patterns within the identification appliance 10 that inform circuitry that the identification appliance 10 has been attached to a wearer or object. If the adhesive attachment of areas of the identification appliance 10 is broken, the printed conductive patterns would detect the break so that the circuit can detect tampering. The configuration and mode of electrical coupling of conductive patterns in the identification appliance 10 to the circuit may vary according to whether the entire identification appliance 10 is a disposable device, a disposable device attached to a reusable transponder, or a reusable device. When tampering is detected, the circuit may disable the identification appliance 10 or disable a function or functions of identification appliance 10. Additionally, the circuit may indicate that tampering has occurred by activating a display, alarm, LED and the like, or by informing a person or another device of the tampering such as by a wireless transmission. Further, the identification appliance 10 may be physically securely fastened such that tampering or removal of the identification appliance 10 would destroy its function or render such tampering or removal evident. The securement may be permanent for the usage life of the identification appliance 10, or may be temporary (e.g., defeatable by an authorized procedure). In the case of temporary securement, the identification appliance 10 may be re-used and re-secured by an authorized agency or person.

The identification appliance 10 may contain a flexible keyboard for data or password entry directly into the circuits. The keyboard may be based on symbolic or alphanumeric data.

The identification appliance 10 may have audio transducers for audio input or output. The identification appliance 10 also may have known algorithms to process speech recognition or output synthesized speech. Further, the identification appliance 10 may allow users to communicate two-way with remote units or have circuitry or algorithms to derive biometric data (such as a user's unique identifying speech patterns) from the user's speech.

For example, such biometric data may include any images of or data about the wearer's fingerprints, retina, iris, or face, or a time domain or frequency domain response of the wearer's voice, or a biochemical assay of the wearer's scent, blood, or breath. In other words, the biometric data may be related to a person's signature, signature plus handwriting dynamics, iris, retina, face recognition, voiceprint, voiceprint and voice stress, fingerprint, other skin pattern, chemical signature (e.g., smell, blood, sweat), DNA signature, or some electric, magnetic, acoustic, or other biometric characteristic. Alternatively, the biometric sensor may provide data about the wearer for purposes other than for identification. For instance, the biometric sensor may be incorporated into the identification appliance to monitor or detect the wearer's pulse rate, heart electrical signals, blood pressure, insulin levels and the like, where such biometric data may be transmitted to other devices (such as monitoring computers at a hospital) constantly, intermittantly, or upon alert conditions.

The identification appliance 10 may provide information about the wearer or object with which it is associated. This information may be written or printed visual information. For example, the identification appliance 10 may have a label or a printable surface to contain the information. The written or printed information may include data that is perceivable to humans, animals, or machines. For example, the data may be alphanumeric data, optical character recognizable data (such as bar codes), images, photographs, magnetically readable data, and/or biometric data such as fingerprint, retina, or voice data.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. As another example, each feature of one embodiment can be mixed and matched with other features shown in other embodiments. Features and processes known to those of ordinary skill in the art of identification appliances may similarly be incorporated as desired. Additionally and obviously, features may be added or subtracted as desired. Accordingly, the invention is not to be restricted except in light of the attached claims and their equivalents.

What is claimed is:

1. A wireless identification band adapted to communicate with another wireless device, the wireless identification band comprising:

a band structure adapted to be worn by or attached to a person, the band structure having a first surface and a second surface, the second surface being located closer to the person than the first surface when the band structure is worn by or attached to the person;

a communication circuit including a data storage device adapted to store data associated with the person, and a control circuit coupled to said data storage device; and a microstrip antenna disposed on or in the band structure, the microstrip antenna comprising a conductive patch layer, a conductive ground layer and a dielectric material disposed between the patch layer and the ground layer, the ground layer being located closer to the person than the patch layer when the structure is worn by or attached to the person;

said control circuit being further coupled to the microstrip antenna, the control circuit being adapted to communicate through the microstrip antenna with the another wireless device;

the band structure comprising at least two layers and the microstrip antenna and communication circuit being embedded between the at least two layers.

2. The wireless identification band of claim 1 wherein the microstrip antenna is flexible.

3. The wireless identification band of claim 1 wherein the dielectric material is flexible.

4. The wireless identification band of claim 1 wherein the microstrip antenna is curved or contoured to be worn by the person.

5. The wireless identification band of claim 1 wherein the control circuit is disposed on the dielectric material.

6. The wireless identification band of claim 1 wherein the control circuit is disposed in the dielectric material.

7. The wireless identification band of claim 6 wherein the control circuit is disposed on the surface of the patch layer which is inside the dielectric material.

8. The wireless identification band of claim 6 wherein the control circuit is disposed on the surface of the ground layer which is inside the dielectric material.

9. The wireless identification band of claim 1 wherein the control circuit is disposed on a surface of the ground layer which is not inside the dielectric material.

10. The wireless identification band of claim 9 further comprising an electrical coupler extending from the control circuit through the dielectric material to the patch layer.

11. The wireless identification band of claim 10 wherein the electrical coupler comprises a hole and a conductor passing through the hole.

12. The wireless identification band of claim 10 wherein the electrical coupler is a conductive conduit which extends from the control circuit to the patch layer.

13. The wireless identification band of claim 5 further comprising an electrical coupler extending from the control circuit through the dielectric material to the patch layer or the ground layer or both the patch layer and the ground layer.

14. The wireless identification band of claim 13 wherein the electrical coupler comprises a hole and a conductor passing through the hole.

15. The wireless identification band of claim 13 wherein the electrical coupler is a conductive conduit which extends from the control circuit to the patch layer or the ground layer or both the patch layer and the ground layer.

16. The wireless identification band of claim 6 further comprising an electrical coupler extending from the control circuit through the dielectric material to the patch layer or the ground layer or both the patch layer and the ground layer.

17. The wireless identification band of claim 16 wherein the electrical coupler comprises a hole and a conductor passing through the hole.

18. The wireless identification band of claim 16 wherein the electrical coupler is a conductive conduit which extends from the control circuit to the patch layer or the ground layer or both the patch layer and the ground layer.

19. The wireless identification band of claim 5 wherein the control circuit is located adjacent to the patch layer.

20. The wireless identification band of claim 1 wherein the control circuit is disposed on a surface of the patch layer which is not inside the dielectric material.

21. The wireless identification band of claim 20 further comprising an electrical coupler extending from the control circuit through the dielectric material to the ground layer.

22. The wireless identification band of claim 21 wherein the electrical coupler comprises a hole and a conductor passing through the hole.

23. The wireless identification band of claim 21 wherein the electrical coupler is a conductive conduit which extends from the control circuit to the ground layer.

24. The wireless identification band of claim 1 wherein the patch layer is disposed on an edge of the structure.

25. The wireless identification band of claim 1 wherein the control circuit comprises a radio frequency identification (RFID) circuit.

26. The wireless identification band of claim 1 wherein the-another wireless device comprises a wireless communication system.

27. The wireless identification band of claim 1 further comprising an audio or visual display coupled to the control circuit.

28. The wireless identification band of claim 1 wherein the control circuit is formed substantially of at least one organic material.

29. The wireless identification band of claim 28 wherein the control circuit is formed entirely of at least one organic material.

30. The wireless identification band of claim 1 wherein the data includes biometric data about the person.

31. The wireless identification band of claim 30 wherein the biometric data includes fingerprint, voice, or retinal characteristics.

32. The wireless identification band of claim 1 wherein the structure is an elongate wristband, armband, legband, or headband.

33. The wireless identification band of claim 1 further comprising a power source formed at least partially out of an organic material.

34. The wireless identification band of claim 1 further comprising a diode formed of an organic material.

35. The wireless identification band of claim 1 wherein the data storage device includes a memory formed of an organic material.

36. The wireless identification band of claim 1 wherein the thickness of the dielectric material is on the order of one-hundredth of the free space wavelength of a signal radiated by the microstrip antenna.

37. The wireless identification band of claim 1 further including a keypad to input data into the data storage device.

38. The wireless identification band of claim 1 wherein the wireless identification band is disposable.

39. The wireless identification band of claim 1 wherein the control circuit is adapted to communicate at or near 400 MHz, 915 MHz, 2.45 GHz, or 5.88 GHz.

40. The wireless identification band of claim 1 wherein the control circuit includes a plurality of circuits.

41. The wireless identification band of claim 1 wherein the data includes medical data about the person.

42. The wireless identification band of claim 1 wherein the microstrip antenna is a continuous radiator.

43. The wireless identification band of claim 1 further comprising a flexible battery coupled to power the control circuit.

44. The wireless identification band of claim 1 wherein the flexible battery comprises an organic material.

45. A wireless identification band adapted to communicate with another wireless device, the wireless identification band comprising:
a band structure adapted to be worn by or attached to a person, the band structure having a first surface and a second surface, the second surface being located closer to the person than the first surface when the band structure is worn by or attached to the person;
a communication circuit including a data storage device adapted to store data associated with the person, and a control circuit coupled to said data storage device; and
a microstrip antenna disposed on or in the band structure, the microstrip antenna comprising a conductive patch layer, a conductive ground layer and a dielectric material disposed between the patch layer and the ground layer, the ground layer being located closer to the person than the patch layer when the structure is worn by or attached to the person;
said control circuit being further coupled to the microstrip antenna, the control circuit being adapted to communicate through the microstrip antenna with the another wireless device;
the band structure further comprising a closure mechanism, the microstrip antenna being a portion of the closure mechanism.

46. The wireless identification band of claim 45 wherein tampering or opening of the closure mechanism after closure of the closure mechanism causes the control circuit to determine that tampering has occurred.

47. The wireless identification band of claim 46 wherein the control circuit is adapted to inform the another wireless device that tampering has occurred.

48. The wireless identification band of claim 46 further comprising an indicator coupled to the control circuit which indicates whether tampering has occurred.

49. A wireless identification appliance adapted to communicate with another wireless device, the identification appliance comprising:
a structure adapted to be worn, attached or carried by a person;
a communication circuit including a data storage device adapted to store data associated with the person, and a control circuit coupled to said data storage device; and
a microstrip antenna disposed on or in the structure such that when the structure is worn, attached or carried by the person, the microstrip antenna is adapted to radiate energy away from the person and to radiate substantially less energy toward the person, the microstrip antenna comprising a conductive patch layer, a conductive ground layer and a dielectric material disposed between the patch layer and the ground layer, the ground layer being located closer to the person than the patch layer when the structure is worn by or attached to or carried by the person;
said control circuit being further coupled to the microstrip antenna, the control circuit being adapted to communicate through the microstrip antenna with the another wireless device;
the structure comprising at least two layers and the microstrip antenna and communication circuit being embedded between the at least two layers.

50. The identification appliance of claim 49 wherein the microstrip antenna is flexible.

51. The identification appliance of claim 49 wherein the microstrip antenna is curved or contoured to be worn by the person.

52. The identification appliance of claim 49 wherein the control circuit is disposed on the dielectric material.

53. The identification appliance of claim 49 wherein the control circuit is disposed in the dielectric material.

54. The identification appliance of claim 53 wherein the control circuit is disposed on the surface of the patch layer which is inside the dielectric material.

55. The identification appliance of claim 53 wherein the control circuit is disposed on the surface of the ground layer which is inside the dielectric material.

56. The identification appliance of claim 49 wherein the control circuit is disposed on a surface of the ground layer which is not inside the dielectric material.

57. The identification appliance of claim 56 further comprising an electrical coupler extending from the control circuit through the dielectric material to the patch layer.

58. The identification appliance of claim 57 wherein the electrical coupler comprises a hole and a conductor passing through the hole.

59. The identification appliance of claim 57 wherein the electrical coupler is a conductive conduit which extends from the control circuit to the patch layer.

60. The identification appliance of claim 52 further comprising an electrical coupler extending from the control circuit through the dielectric material to the patch layer or the ground layer or both the patch layer and the ground layer.

61. The identification appliance of claim 60 wherein the electrical coupler comprises a hole and a conductor passing through the hole.

62. The identification appliance of claim 60 wherein the electrical coupler is a conductive conduit which extends from the control circuit to the patch layer or the ground layer or both the patch layer and the ground layer.

63. The identification appliance of claim 53 further comprising an electrical coupler extending from the control circuit through the dielectric material to the patch layer or the ground layer or both the patch layer and the ground layer.

64. The identification appliance of claim 63 wherein the electrical coupler comprises a hole and a conductor passing through the hole.

65. The identification appliance of claim 63 wherein the electrical coupler is a conductive conduit which extends from the control circuit to the patch layer or the ground layer or both the patch layer and the ground layer.

66. The identification appliance of claim 52 wherein the control circuit is located adjacent to the patch layer.

67. The identification appliance of claim 49 wherein the control circuit is disposed on a surface of the patch layer which is not inside the dielectric material.

68. The identification appliance of claim 67 further comprising an electrical coupler extending from the control circuit through the dielectric material to the ground layer.

69. The identification appliance of claim 68 wherein the electrical coupler comprises a hole and a conductor passing through the hole.

70. The identification appliance of claim 68 wherein the electrical coupler is a conductive conduit extending from the control circuit to the ground layer.

71. The identification appliance of claim 49 wherein the patch layer is disposed on an edge of the structure.

72. The identification appliance of claim 49 wherein the control circuit comprises a radio frequency identification (RFID) circuit.

73. The identification appliance of claim 49 wherein the control circuit is formed substantially of at least one organic material.

74. The identification appliance of claim 73 wherein the control circuit is formed entirely of at least one organic material.

75. The identification appliance of claim 49 wherein the data includes biometric data about the person.

76. The identification appliance of claim 49 wherein the structure is an elongate wristband, armband, legband, or headband.

77. The identification appliance of claim 49 further comprising a power source formed at least partially out of an organic material.

78. The identification appliance of claim 49 further comprising a diode formed of an organic material.

79. The identification appliance of claim 49 wherein the data storage device includes a memory formed of an organic material.

80. The identification appliance of claim 52 wherein the thickness of the dielectric material is on the order of one-hundredth of the free space wavelength of a signal radiated by the microstrip antenna.

81. The identification appliance of claim 49 wherein the microstrip antenna in a continuous radiator.

82. The identification appliance of claim 49 wherein the identification appliance is an identification card.

83. The identification appliance of claim 49 wherein the identification appliance is a patch that can be affixed to an article of clothing.

84. The identification appliance of claim 49 further comprising a flexible battery coupled to power the control circuit.

85. The identification appliance of claim 84 wherein the flexible battery comprises an organic material.

86. A wireless identification appliance adapted to communicate with another wireless device, the identification appliance comprising:

a structure adapted to be worn, attached or carried by a person;

a communication circuit including a data storage device adapted to store data associated with the person, and a control circuit coupled to said data storage device; and a microstrip antenna disposed on or in the structure such that when the structure is worn, attached or carried by the person, the microstrip antenna is adapted to radiate energy away from the person and to radiate substantially less energy toward the person, the microstrip antenna comprising a conductive patch layer, a conductive ground layer and a dielectric material disposed between the patch layer and the ground layer, the ground layer being located closer to the person than the patch layer when the structure is worn by or attached to or carried by the person;

said control circuit being further coupled to the microstrip antenna, the control circuit being adapted to communicate through the microstrip antenna with the another wireless device;

the structure further comprising a closure mechanism, the microstrip antenna being a portion of the closure mechanism; and wherein tampering or opening of the closure mechanism after closure of the closure mechanism causes the control circuit to determine that tampering has occurred.

87. The identification appliance of claim 86 further comprising an indicator coupled to the control circuit which indicates whether tampering has occurred.

88. A wireless identification band adapted to communicate with another wireless device, the wireless identification band comprising:

a band structure adapted to be worn by or attached to a person, the band structure having a first surface and a second surface, the second surface being located closer to the person than the first surface when the band structure is worn by or attached to the person;

a communication circuit including a data storage device adapted to store data associated with the person, and a control circuit coupled to said data storage device; and a microstrip antenna disposed on or in the band structure, the microstrip antenna comprising a conductive patch layer, a conductive ground layer and a dielectric material disposed between the patch layer and the ground layer, the ground layer being located closer to the person than the patch layer when the structure is worn by or attached to the person; and said control circuit being further coupled to the microstrip antenna, the control circuit being adapted to communicate through the microstrip antenna with the another wireless device;

the band structure comprising an elongated flexible strap, and the microstrip antenna and communication circuit comprising thin film, flexible elements carried by said strap.

89. The wireless identification band of claim 88 wherein the dielectric material is flexible.

90. The wireless identification band of claim 88 wherein the control circuit is disposed on the dielectric material.

91. The wireless identification band of claim 88 wherein the control circuit is disposed on the surface of the patch layer which is inside the dielectric material.

92. The wireless identification band of claim 90 wherein the control circuit is disposed on the surface of the ground layer.

93. The wireless identification band of claim 92 further comprising an electrical coupler extending from the control circuit through the dielectric material to the patch layer.

94. The wireless identification band of claim 93 wherein the electrical coupler comprises a hole and a conductor passing through the hole.

95. The wireless identification band of claim 93 wherein the electrical coupler is a conductive conduit which extends from the control circuit to the patch layer.

96. The wireless identification band of claim 90 further comprising an electrical coupler extending from the control circuit through the dielectric material to the patch layer or the ground layer or both the patch layer and the ground layer.

97. The wireless identification band of claim 88 wherein the control circuit comprises a radio frequency identification (RFID) circuit.

98. The wireless identification band of claim 88 wherein the control circuit is adapted to communicate with another wireless device comprises a wireless communication system.

99. The wireless identification band of claim 88 further comprising an audio or visual display coupled to the control circuit.

100. The wireless identification band of claim 88 wherein the control circuit is formed substantially of at least one organic material.

101. The wireless identification band of claim 88 wherein the data includes biometric data about the person.

102. The wireless identification band of claim 88 further comprising a power source formed at least partially out of an organic material.

103. The wireless identification band of claim 88 further comprising a diode formed of an organic material.

104. The wireless identification band of claim 88 wherein the data storage device includes a memory formed of an organic material.

105. The wireless identification band of claim 88 wherein the thickness of the dielectric material is on the order of one-hundredth of the free space wavelength of a signal radiated by the microstrip antenna.

* * * * *